(12) United States Patent
Kashihara et al.

(10) Patent No.: US 11,732,803 B2
(45) Date of Patent: Aug. 22, 2023

(54) METAL SEAL

(71) Applicant: MITSUBISHI CABLE INDUSTRIES, LTD., Tokyo (JP)

(72) Inventors: Kazuyuki Kashihara, Arida (JP); Satoshi Toudou, Arida (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/506,530

(22) Filed: Oct. 20, 2021

(65) Prior Publication Data
US 2022/0154828 A1 May 19, 2022

(30) Foreign Application Priority Data
Nov. 17, 2020 (JP) ................................. 2020-191060

(51) Int. Cl.
*F16J 15/3204* (2016.01)

(52) U.S. Cl.
CPC ................................. *F16J 15/3204* (2013.01)

(58) Field of Classification Search
CPC .... F16J 15/00; F16J 15/02; F16J 15/21; F16J 15/46; F16J 15/48; F16J 15/08; F16J 15/16; F16J 15/50; F16J 15/52; F16J 15/32; F16J 15/3204; F16J 15/3208; F16J 15/3212; F16J 15/3232; F16J 15/3236
USPC .......................................................... 277/549
See application file for complete search history.

(56) References Cited

U.S. PATENT DOCUMENTS

| 9,109,732 | B2 * | 8/2015 | Vu | ......................... F16L 23/18 |
| 9,739,378 | B2 * | 8/2017 | Vu | ....................... F16J 15/0806 |
| 2004/0012157 | A1 * | 1/2004 | Oida | ...................... F16L 17/025 |
| | | | | 277/626 |

FOREIGN PATENT DOCUMENTS

JP         4091373 B2      5/2008

* cited by examiner

*Primary Examiner* — Nathan Cumar
(74) *Attorney, Agent, or Firm* — Kratz, Quintos & Hanson, LLP

(57) ABSTRACT

The metal seal has a middle base portion 3 of which cross-sectional configuration is laterally long rectangular, a first main convex portion 1 and a first auxiliary convex portion 11, and a second main convex portion 2 and a second auxiliary convex portion 12 respectively disposed on both ends of long sides 3A of the middle base portion 3. Ridge lines of the convex portions 1, 11, 2, and 12 form common straight lines $L_{10}$ and $L_{20}$ continuous to short sides of the rectangular.

11 Claims, 14 Drawing Sheets

METAL SEAL

BACKGROUND OF THE INVENTION

1. Field of the Invention

This invention relates to a metal seal, especially, a metal seal for sealing between two planes.

2. Description of the Related Art

Conventionally, metal seal 60 shown in FIG. 13A through FIG. 14 is proposed by the inventors of the present invention (refer to Japanese patent No. 4091373). That is to say, this metal seal 60 is disposed between a first plane $P_1$ and a second plane $P_2$ mutually parallel (refer to FIG. 14), entirely ring shaped, and having a middle base portion 63 of which cross section is rectangular, a first convex portion 66 of half circular cross section which contacts the first plane $P_1$ on an inner side, and a second convex portion 67 of half circular cross section which contacts the second plane $P_2$ on an outer side.

And, in attached compressed state (used state), as shown in FIG. 14, the metal seal 60 receives pressing force from the first plane $P_1$ and the second plane $P_2$ mutually closing, and rotational deformation is generated around a center of gravity of the middle base portion 63. When the first plane $P_1$ and the second plane $P_2$ are made mutually closing further, as shown in FIG. 14, corner portions 68 and 69 are pressed, 4 points are pressed to the first plane $P_1$ and the second plane $P_2$, and pressed sealing state can be kept with sufficient contact pressure equal to or more than 1000 MPa necessary for sealing.

However, in the metal seal 60 of the cross sectional configuration shown in FIG. 13A through FIG. 14, plastically deforming (crashing) metal material, it is necessary to give extremely large force (compressive load) to the flange planes (the first and second planes) $P_1$ and $P_2$.

Therefore, has been revealed that the conventional metal seal 60 shown in FIG. 13A through FIG. 14 has following problems.

That is to say, (i) bolts of large diameter or increasing the number of bolts is necessary for the large load on fastening bolts to give the large compressive load, (ii) along this, it is difficult to make the whole apparatus compact, and damages such as scratches may be given to the flange surface (the first and second planes $P_1$ and $P_2$).

Therefore, it is an object of the present invention to provide a metal seal with which the conventional problems (i)(ii)(iii) are solved, fastening is possible with relatively small compressive force, load on the fastening bolts is reduced, and the apparatus can be made compact. Further, it also an object to provide a metal seal with which frictional amount with the flange face during the rotation elastic deformation (before plastic deformation) is reduced, and also the compressive force in the deformation is reduced to further reduce the scratches on the flange face.

BRIEF DESCRIPTION OF THE DRAWING

The present invention will be described with reference to the accompanying drawings in which.

DESCRIPTION OF THE PREFERRED EMBODIMENTS

Figure 1A:
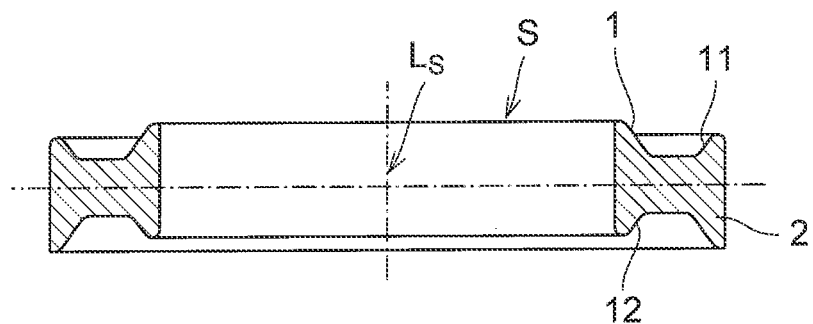
FIG. 1A is an enlarged cross-sectional front view showing an embodiment of the present invention.
Figure 1B:
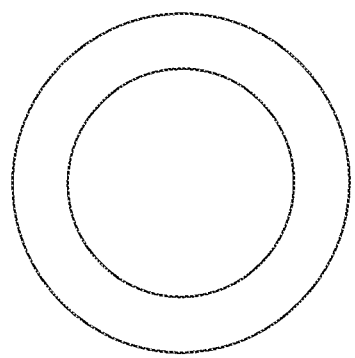
FIG. 1B is a top view showing the embodiment of the present invention.
Figure 1C:
FIG. 1C is a front view showing the embodiment of present invention.
Figure 1D:
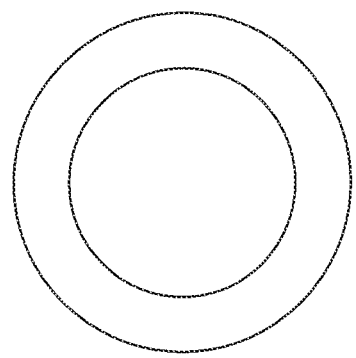
FIG. 1D is a bottom view showing the embodiment of the present invention.

Preferred embodiments of the present invention will now be described with reference to the accompanying drawings.

As shown in FIG. 1A through FIG. 4, a metal seal S relating to the present invention is disposed between first plane $P_1$ and a second plane $P_2$ mutually parallel. And, the entire seal is ring-shaped such as circular, elliptic, polygonal, etc. to seal between the parallel two planes $P_1$ and $P_2$.

To explain a cross-sectional configuration of the metal seal S, the configuration has a rectangular middle base portion 3, a first main convex portion 1 on an inner side to contact the first plane $P_1$, and a first auxiliary convex portion 11 on an outer side. Further, the configuration has second main convex portion 2 on the outer side to contact the second plane $P_2$, and a second auxiliary convex portion 12 on the inner side.

Figure 2:
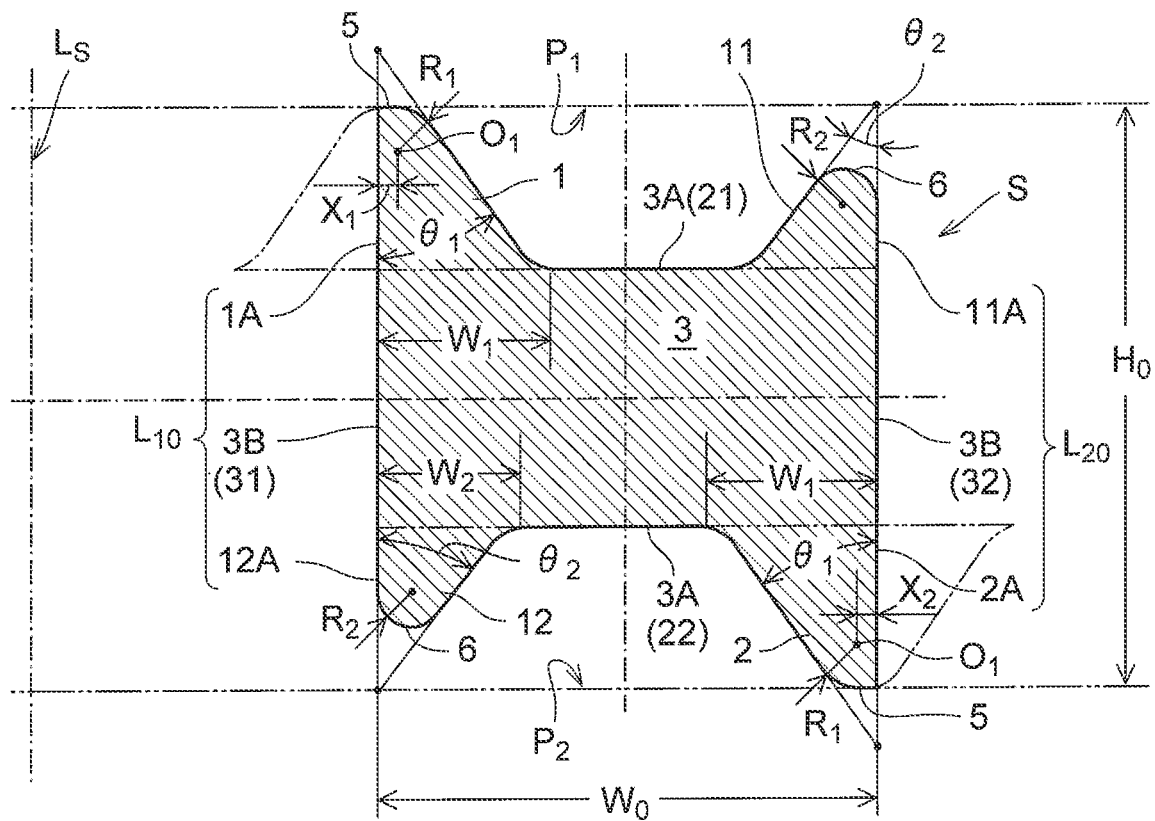
FIG. 2 is an enlarged cross sectional view.

In FIG. 1A and FIG. 2, a mark Ls shows an axis of the entire metal seal S, and the axis Ls is shown extremely near the cross section of the seal in comparison with actual product.

The middle base portion 3 is composed of long sides 3A parallel to the first and second planes $P_1$ and $P_2$, and short sides 3B at right angles with the long sides 3A. To distinguish the long sides 3A, they are called as a first long side 21 and a second long side 22 in some cases. And, to distinguish the short sides 3B, they are called as a first short side 31 and a second short side 32 in some cases.

Figure 3:
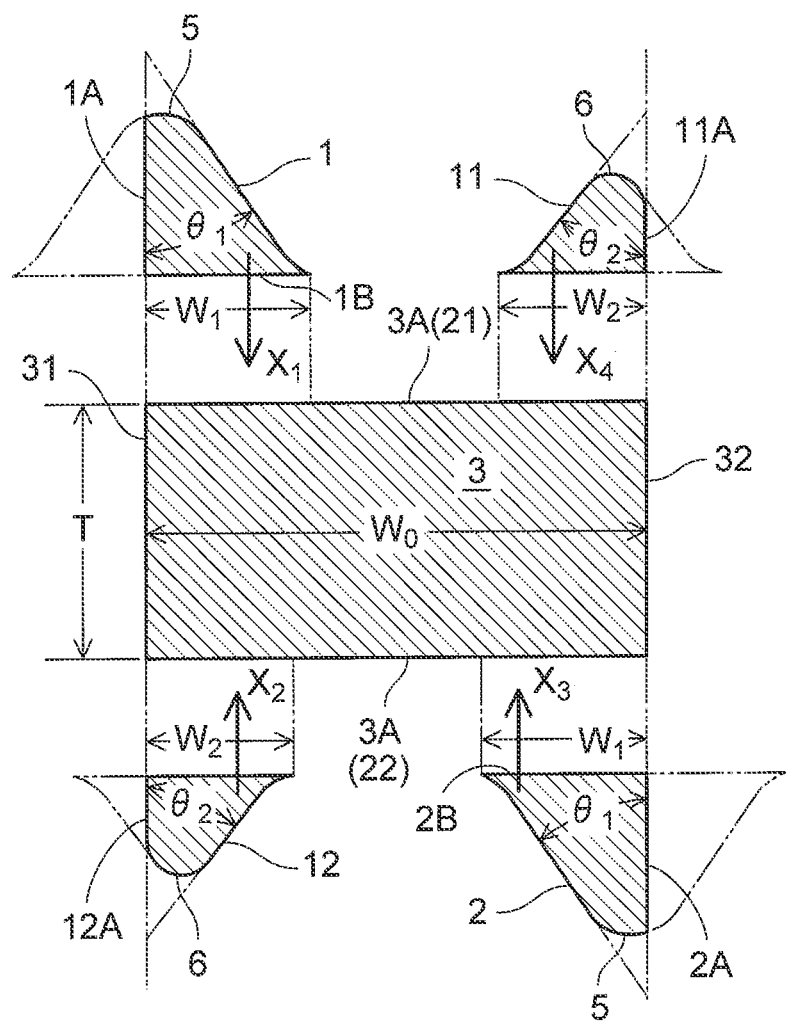
FIG. 3 is a disassembled cross-sectional explanatory view to plain configurations and dimensional relationships.

And, as shown in FIG. 2 and FIG. 3 (showing disassembled state), the first main convex portion 1 is hill-shape having an inner peripheral portion 1A like a vertical cliff on an inner peripheral side, and, the second auxiliary convex portion 12 (although the hill is inverted in FIG. 2) has a similar cross-sectional configuration having an inner peripheral portion 12A like a vertical cliff on the inner peripheral side.

And, in a disassembled view of FIG. 3, as shown with arrows $X_1$ and $X_2$, the first main convex portion 1 and the second auxiliary convex portion 12 are made contact end portions on an inner short side 31 of the long sides 3A of the middle base portion 3 to make the inner peripheral portion 1A of the first main convex portion 1, the inner short side 31 of the middle base portion 3, and the inner peripheral portion 12A of the second auxiliary convex portion 12 continuous (in cross-sectional face) with a common straight line $L_{10}$.

Further, as shown in FIG. 2 and FIG. 3, (although being inverted hill-shape) the second main convex portion has an outer peripheral portion 2A like a vertical cliff on an outer peripheral side, and, the first auxiliary convex portion 11 has a similar hill-shape cross-sectional configuration having an outer peripheral portion 11A like a vertical cliff on the outer peripheral side.

And, in a disassembled view of FIG. 3, as shown with arrows $X_3$ and $X_4$, the second main convex portion 2 and the first auxiliary convex portion 11 are made contact end portions on an outer short side 32 of the long skies 3A of the middle base portion 3 to make the outer peripheral portion 2A of the second main convex portion 2, the outer short side 32 of the middle base portion 3, and the outer peripheral portion 11A of the first auxiliary convex portion 11 continuous (in cross-sectional face) with a common straight line $L_{20}$.

And, each of the first main convex portion 1, the first auxiliary convex portion 11, the second main convex portion 2, and the second auxiliary convex portion 12 has an arc-shaped peak portion 5 or 6 on a forth end.

And, dimension of a bottom side 1B of the first main convex portion 1 and a bottom side 2B of the second main convex portion 2 is $W_1$, dimension of the long side 3A of the middle base portion 3 is $W_0$, and a formula 1 below is fulfilled.

$$0.20 \cdot W_0 \leq W_1 \leq 0.45 \cdot W_0 \quad \text{(formula 1)}$$

Further, radius of curvature of the arc-shaped peak portion 5 of the forth end of the first main convex portion 1 and the second main convex portion 2 in cross-sectional face is $R_1$, height dimension of the entire metal seal is $H_0$, and a formula 2 below is fulfilled.

$$0.05 \cdot H_0 \leq R_1 \leq 0.25 \cdot H_0 \quad \text{(formula 2)}$$

Further, radius of curvature of the arc-shaped peak portion 6 of the forth end of the first auxiliary convex portion 11 and the second auxiliary convex portion 12 is $R_2$, height dimension of the entire metal seal is $H_0$, and a formula 3 below is fulfilled.

$$0.05 \cdot H_0 \leq R_2 \leq 0.125 \cdot H_0 \quad \text{(formula 3)}$$

And, distances from a center $0_1$ of an inscribed circle (having the radius $R_1$) in cross-sectional face of the arc-shaped peak portion 5 of the forth end of the first main convex portion 1 and the second main convex portion 2 to one of the common straight lines $L_{10}$ and $L_{20}$ (respectively on nearer positions) are $X_1$ and $X_2$, height dimension of the entire metal seal is $H_0$, and formulas 4 and 5 below are fulfilled.

$$0 \leq X_1 \leq 0.25 \cdot H_0 \quad \text{(formula 4)}$$

$$0 \leq X_2 \leq 0.125 \cdot H_0 \quad \text{(formula 5)}$$

$X_1=0$ means that the center $0_1$ is on the inner peripheral portion 1A, $X_2=0$ means that the center $0_1$ is on the outer peripheral portion 2A.

Next, an angle formed by ridge lines on outer and inner peripheral sides of the first main convex portion 1 and the second main convex portion 2 is $\theta_1$, a formula 6 below is fulfilled.

$$25° \leq \theta_1 \leq 45° \quad \text{(formula 6)}$$

And, an angle formed by ridge lines on outer and inner peripheral sides of the first auxiliary convex portion 11 and the second auxiliary convex portion 12 is $\theta_2$, and a formula 7 below is fulfilled.

$$25° \leq \theta_2 \leq 45° \quad \text{(formula 7)}$$

Figure 4:
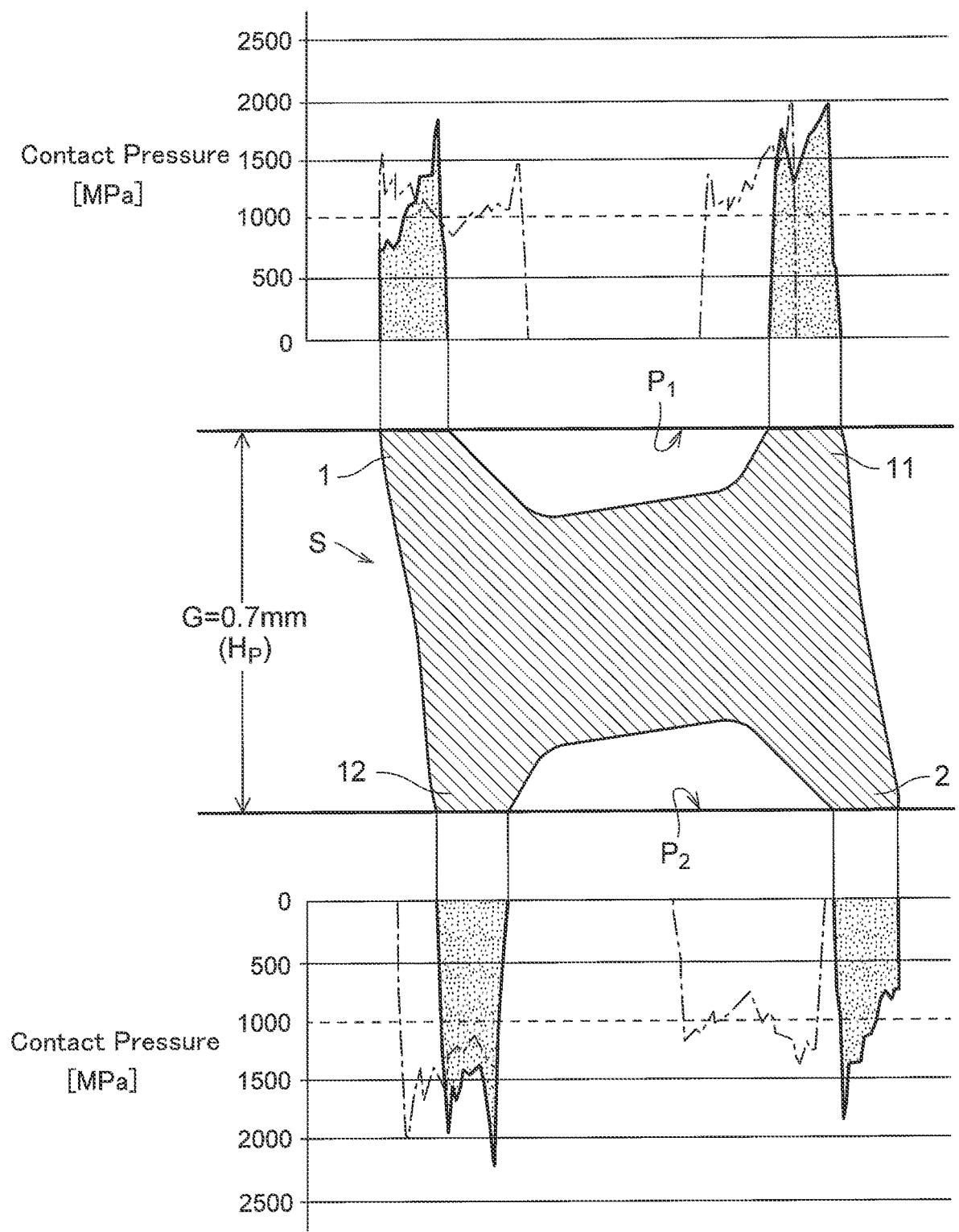
FIG. 4 is a view showing cross-sectional configuration of a product of the present invention final fastened and compressed state obtained by FEM analysis, and contact pressure against first and second lanes.
Figure 9:
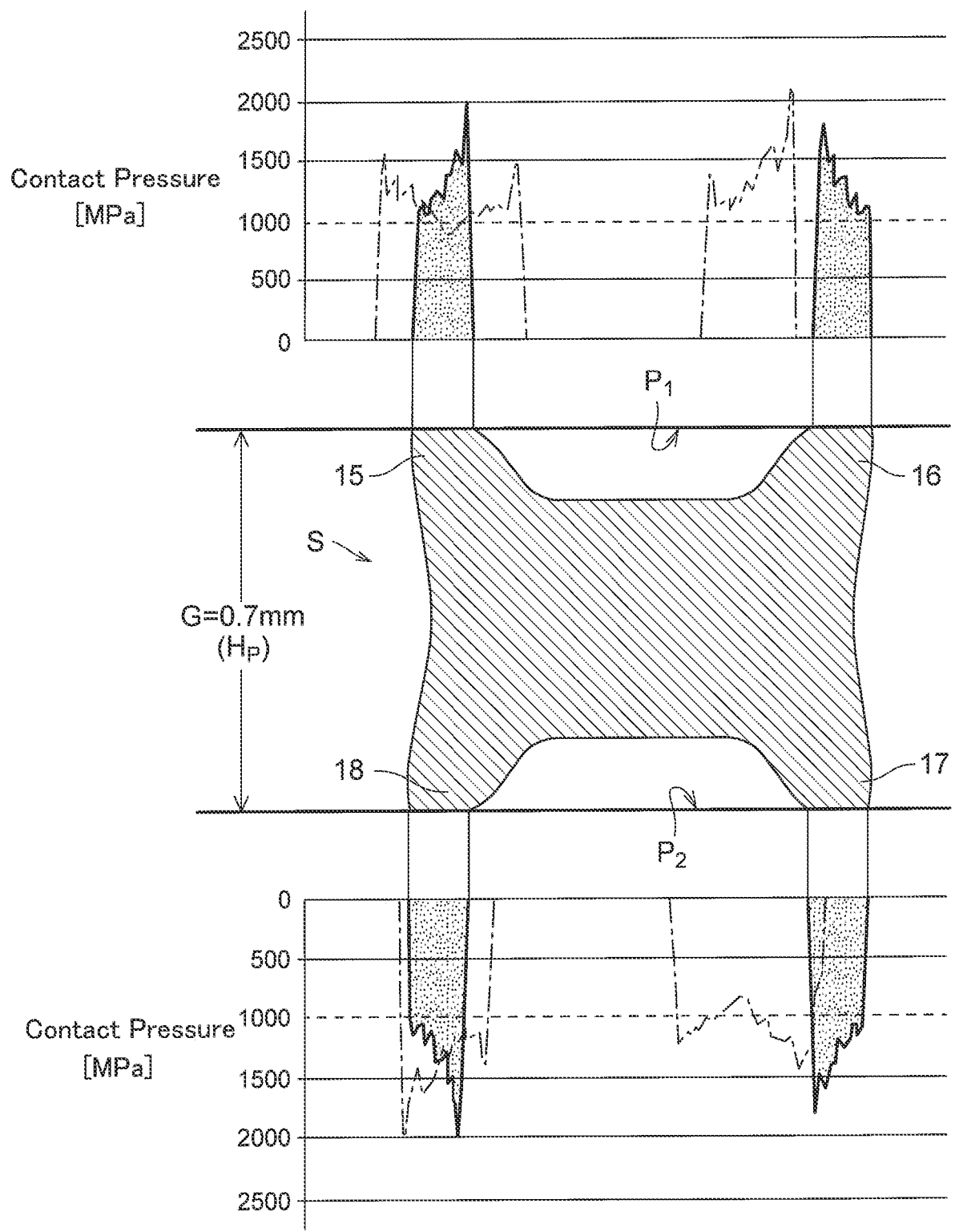
FIG. 9 is a view showing cross-sectional configuration of a product of the present invention in final fastened and compressed state obtained by FEM analysis, and contact pressure against first and second planes.
Figure 14:
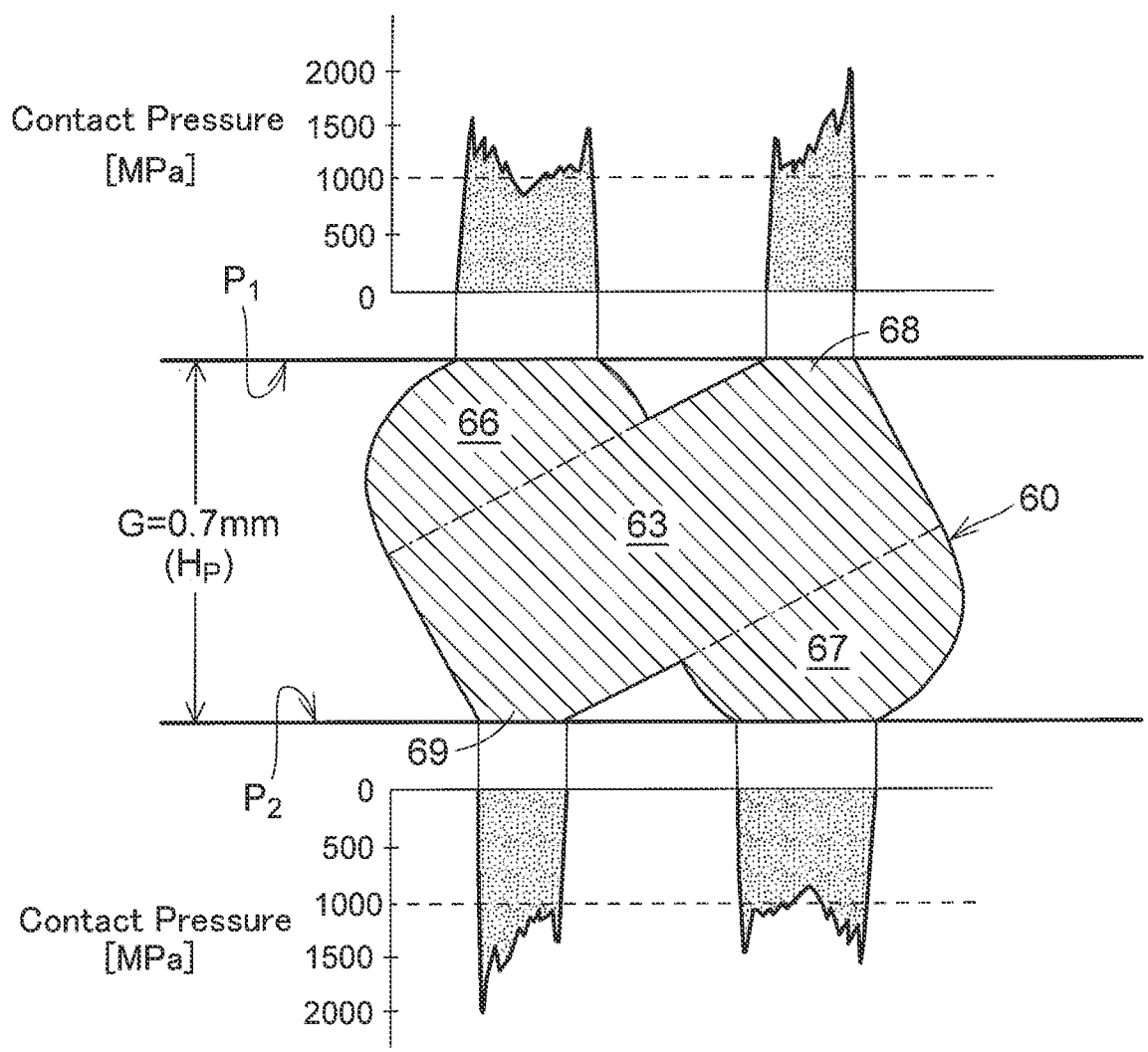
FIG. 14 is a view showing cross-sectional configuration of the conventional example in final fastened and compressed state obtained by FEM analysis, and contact pressure against first and second planes.

The metal seal S of the embodiment of the present invention, described above with FIG. 1A through FIG. 3, along mutual approach of the first plane $P_1$ and the second plane $P_2$, firstly generates rotation elastic deformation, then, becomes final fastened and compressed state (so-called set state) in which contacts (pressed) on 4 positions as shown in FIG. 4. Waveform and value of contact pressure on the 4 positions in this state will be described later in detail with FIG. 9 showing another embodiment and FIG. 14 showing a conventional example.

Figure 5:
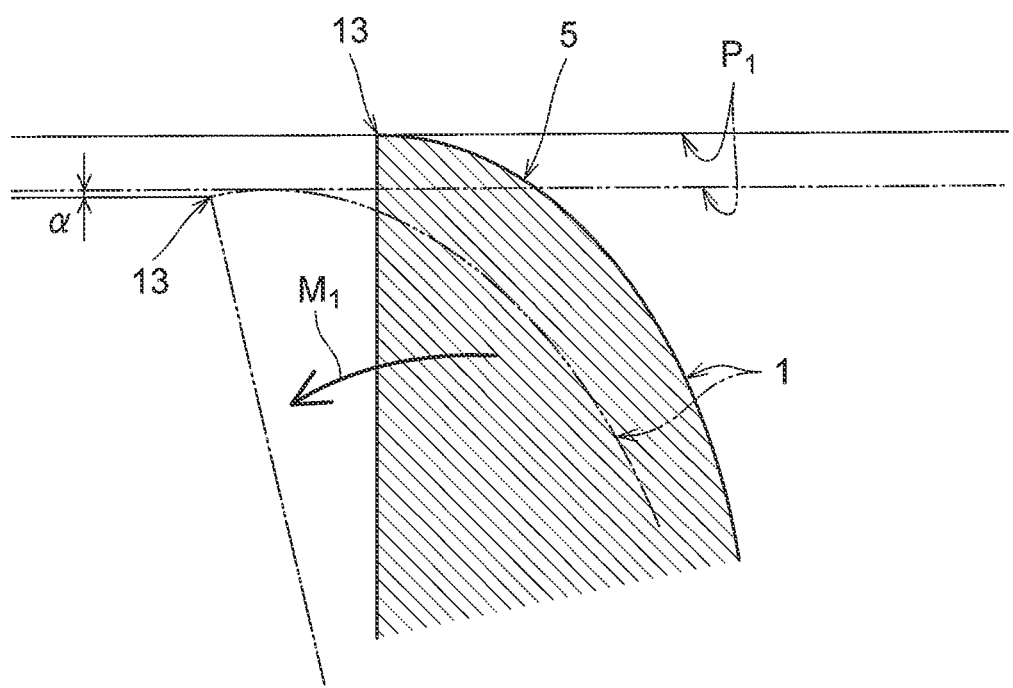
FIG. 5 is a cross-sectional view to explain functions.

FIG. 5 is an explanatory view of the moment when the first plane $P_1$ and second plane $P_2$ in the state of FIG. 2 start approach. As shown in FIG. 5, along the rotation elastic deformation of the metal seal S, the first main convex portion 1 starts movement in an arrow $M_1$ direction in FIG. 5, the arc-shaped peak portion 5 of the first main convex portion 1 slides on the first plane $P_1$, a foremost corner portion 13 shows a movement part from the first plane $P_1$ (refer to a micro gap α) to artfully avoid damaging the first plane $P_1$ by the foremost corner portion 13.

Next, another embodiment shown in FIG. 6A through FIG. 9 is described. This embodiment is similar to the above-described embodiment shown in FIG. 1A through FIG. 5 in that the seal S is disposed between a first plane $P_1$ and a second plane $P_2$ mutually parallel, and, the entire seal is ring-shaped such as circular, elliptic, polygonal, etc.

However, the metal seal S of FIG. 6A through FIG. 9 always reaches for the set state without rotation elastic deformation.

To describe concrete cross-sectional configuration, etc. a rectangular middle base portion 3, a first inner convex portion 15 on an inner side to contact the first plane $P_1$, a first outer convex portion 16 on an outer side, a second outer convex portion 17 on the outer side to contact the second plane $P_2$, and a second inner convex portion 18 on the inner side, are provided.

And, the first, inner convex portion 15, hill-shape in cross section, has an inner peripheral portion 15A like a vertical cliff on an inner peripheral side, and, the second inner convex portion 18 (inverted hill-shape) has an inner peripheral portion 18A like a vertical cliff on an inner peripheral side. And, the inner peripheral portion 15A, an inner short side 31 of the middle base portion 3, and the inner peripheral portion 18A are continuous in cross-sectional face with a common straight line $L_{10}$. The common straight line $L_{10}$ is parallel to the sealing axis Ls.

And, an outer peripheral portion 17A of the second outer convex portion 17, an outer short side 32 of the middle base portion 3, and an outer peripheral portion 16A of the first outer convex portion 16 are continuous in cross-sectional face with a common straight line $L_{20}$.

Further, the first inner convex portion 15, the first outer convex portion 16, the second outer convex portion 17, and the second inner convex portion 18 are respectively having an arc-shaped peak portion 5 on a forth end.

Figure 8:
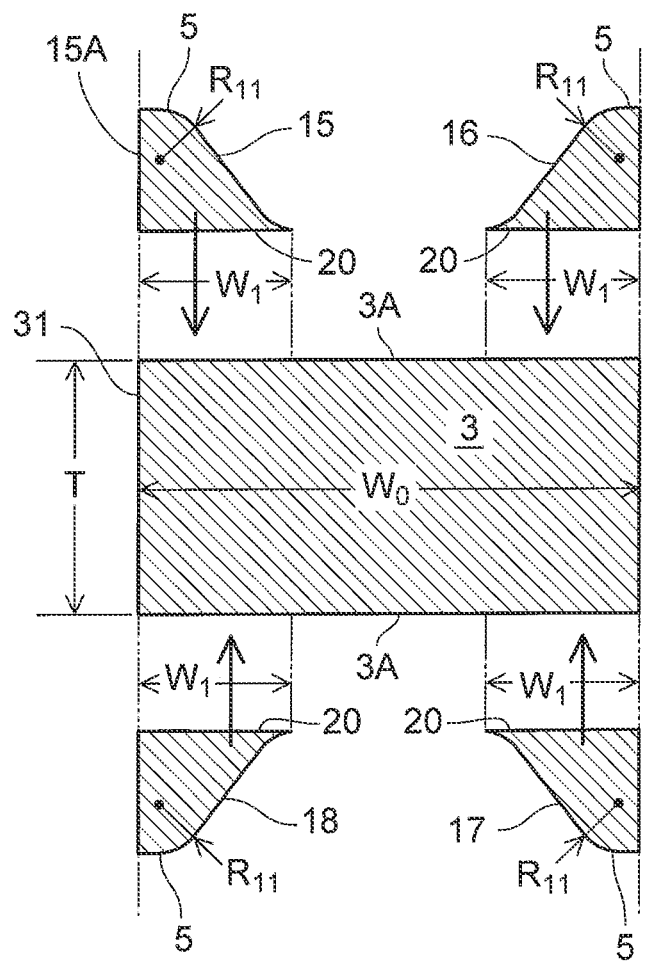
FIG. 8 is a disassembled cross-sectional view to explain configurations and dimensional relationships.

And, as clearly shown in cross section of FIG. 8, etc., dimensions of bottom sides 20 of the 4 convex portions 15, 16, 17, and 18 are set to be approximately same. Further, when the dimension of the bottom side 20 is $W_1$, a formula 8 below is fulfilled.

$$0.20 \cdot W_0 \leq W_1 \leq 0.45 \cdot W_0 \quad \text{(formula 8)}$$

Further, when radius of curvature of the arc-shaped peak portion 5 of the first inner convex portion 15, the first outer convex portion 16, the second inner convex portion 18, and the second outer convex portion 17 in cross-sectional face is $R_{11}$, and height dimension of the entire metal seal is $H_0$, a formula 9 below is fulfilled.

$$0.05 \cdot H_0 \leq R_{11} \leq 0.25 \cdot H_0 \quad \text{(formula 9)}$$

And, when distance from a center $0_1$ of an inscribed circle in cross-sectional face of the arc-shaped peak portion 5 of the first inner convex portion 15, the second inner convex portion 18, the first outer convex portion 16, and the second outer convex portion 17 to respectively nearer one of the common straight lines $L_{10}$ and $L_{20}$ is $X_{11}$, and height dimension of the entire metal seal is $H_0$, a formula 10 below is fulfilled.

$$0 \leq X_{11} \leq 0.25 \cdot H_0 \quad \text{(formula 10)}$$

And, when an angle formed by ridge lines on outer and inner peripheral sides of the first inner convex portion 15, the second inner convex portion 18, the first outer convex portion 16, and the second outer convex portion 17 is $\theta_{11}$, a formula 11 below is fulfilled.

$$25° \leq \theta_{11} \leq 45° \quad \text{(formula 11)}$$

Figure 13A:
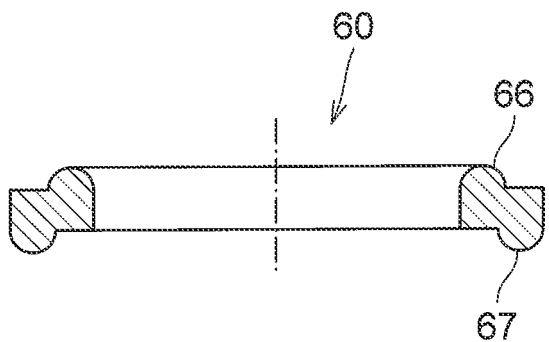
FIG. 13A is an entire cross-sectional front view showing a conventional example.
Figure 13B:
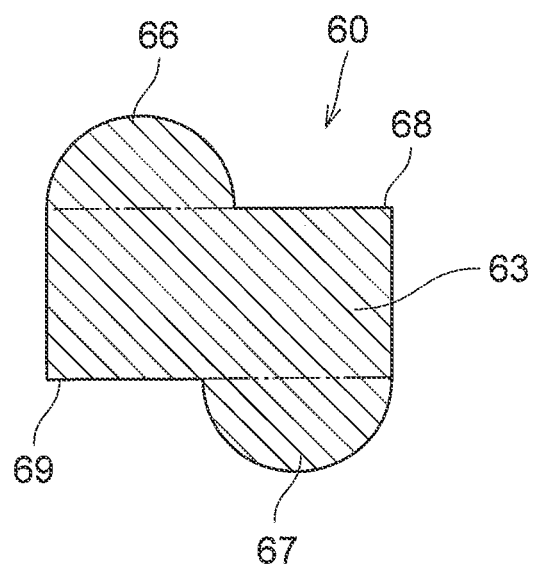
FIG. 13B is an enlarged cross-sectional view of principal portion showing the conventional example.

Next, in case that an interval dimension Hp (set height G) of the first plane $P_1$ and the second plane $P_2$ is reduced for the (first) embodiment of the present invention described with FIG. 1A through FIG. 2, and for the conventional example shown in FIGS. 13A and 13B respectively, the seal generates rotation elastic deformation around the center of gravity in cross section of the seal, then, reaches for plastic deformation area shown in FIG. 4 add FIG. 14 through a 4-point contact state to generate large deformation.

FIG. 4 and FIG. 14 show deformed state of final fastened and compressed state (so-called set state), wherein the interval dimension Hp of the first plane $P_1$ and the second plane $P_2$ is reduced to 0.7 mm against the metal seals S and 60 of which height dimension is 1.0 mm in free state, namely, the set height G of the metal seals S and 60 is 0.7 mm, and each contact pressure against the first plane $P_1$ and the second plane $P_2$. The cross-sectional configuration of the seal and the contact pressure in FIG. 4 and FIG. 14 are results obtained by FEM analysis. And, as shown in later-described FIG. 11, a use range Gx of the seal may have certain width.

By comparison of FIG. 4 with FIG. 14, followings are shown. Difference of waveform of the product of the present invention and the conventional example is clearly shown by drawing the waveforms showing 4 contact pressures of FIG. 14 with one-dot chain lines in upper and lower graphs in FIG. 4.

That is to say, FIG. 4 and FIG. 14 show following points. (i) The waveform of the contact pressure against the first plane $P_1$ appears large (high) on the first auxiliary convex portion 11, and appears small (low) on the first main convex portion 1 in the product of the present invention. (ii) The waveform of the contact pressure against the second plane $P_2$ appears large on the second auxiliary convex portion 12, and appears small (low) on the second main convex portion 2 in the product of the present invention. (iii) In the conventional example, the waveform on the first convex portion 66 is wide, having rather low maximum height and large area in comparison with the waveform of the corner portion 68. (iv) In the conventional example, the waveform on the second convex portion 67 is wide, having rather low maximum height and large area in comparison with the waveform of the corner portion 69. (v) The height of the 4 waveforms shows value (contact pressure) over 1000 MPa to sufficiently show sealing ability in both of the product of the present invention and the conventional example.

Figure 6A:
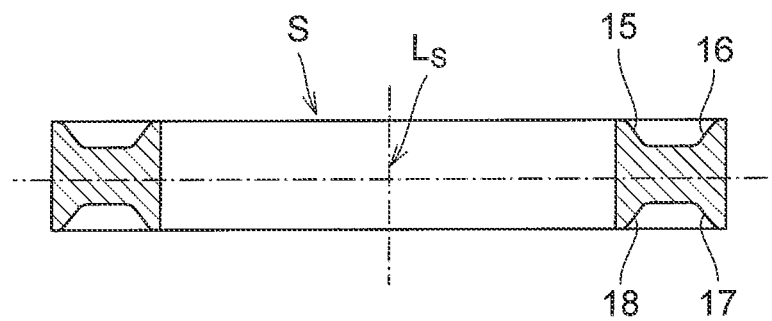
FIG. 6A is an enlarged cross-sectional front view showing another embodiment of the present invention.
Figure 6B:
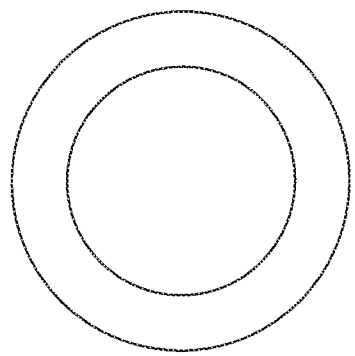
FIG. 6B is a top view showing the other embodiment of the present invention.
Figure 6C:
FIG. 6C is a front view showing the other embodiment of the present invention.
Figure 6D:
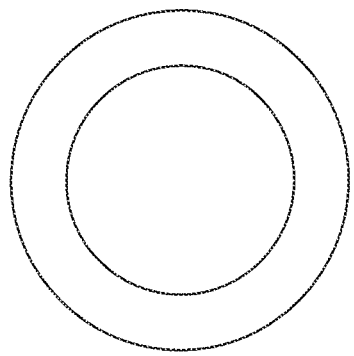
FIG. 6D is a bottom view showing the other embodiment of the present invention.
Figure 7:
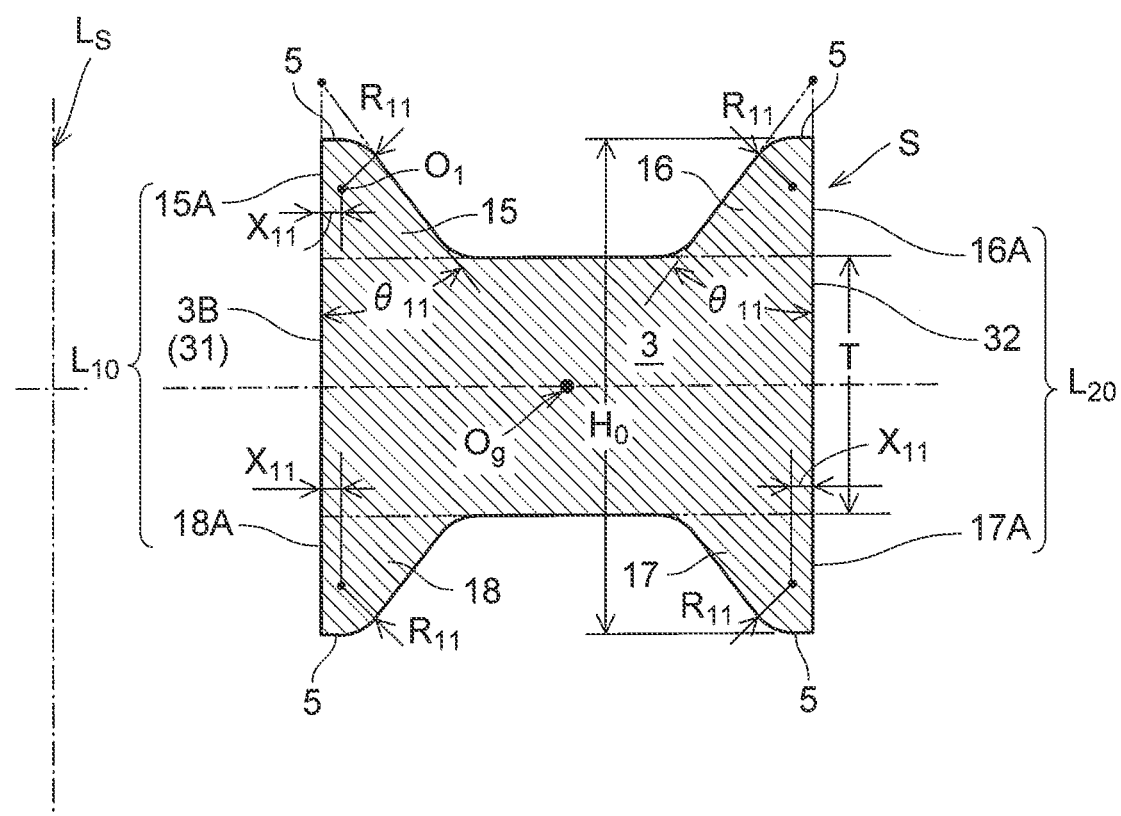
FIG. 7 is an enlarged cross-sectional view.

Next, in case that an interval dimension Hp (set height G) of the first plane $P_1$ and the second plane $P_2$ is reduced for the (second) embodiment of the present invention described with FIG. 6A through FIG. 7, and for the conventional example shown in FIGS. 13A and 13B respectively, the rotation elastic deformation in cross section of the seal is not generated in the second embodiment of FIG. 6A through FIG. 7, the seal is in the 4-point contact state from the beginning, and reaches for the plastic deformation area shown in FIG. 9 through elastic deformation to generate large deformation.

FIG. 9 and FIG. 14 show deformed state of final fastened and compressed state, wherein the interval dimension Hp of the first plane $P_1$ and the second plane $P_2$ is reduced to 0.7 mm against the metal seals S and 60 of which height dimension is 1.0 mm in free state, namely, the set height G of the metal seals S and 60 is 0.7 mm, and each contact pressure against the first plane $P_1$ and the second plane $P_2$.

By comparison of FIG. 9 with FIG. 14, followings are shown. Difference of waveform of the second product of the present invention and the conventional example is clearly shown by drawing the waveforms showing 4 contact pressures of FIG. 14 with one-dot chain lines in upper and lower graphs in FIG. 9.

That is to say, FIG. 9 and FIG. 14 show following points. (i) The waveform of the contact pressure against the first plane $P_1$ is approximately same the first inner convex portion 15 and on the first outer convex portion 16 in the product of the present invention. (ii) The waveforms of the contact pressure against the second plane $P_2$ are approximately same in the product of the present invention. (iii) In the conventional example, the waveform on the first convex portion 66 is wide, having rather low maximum height and large area in comparison with the waveform of the corner portion 63. (iv) In the conventional example, the waveform on the second convex portion 67 is wide, having rather low maximum height and large area in comparison with the waveform of the corner portion 69, (v) In the conventional example, height and area of the waveform are approximately same on 4 positions. (vi) The height of the 4 waveforms shows high value (contact pressure) over 1000 MPa to sufficiently show sealing ability in both of the product of the present invention and the conventional example.

Figure 11:
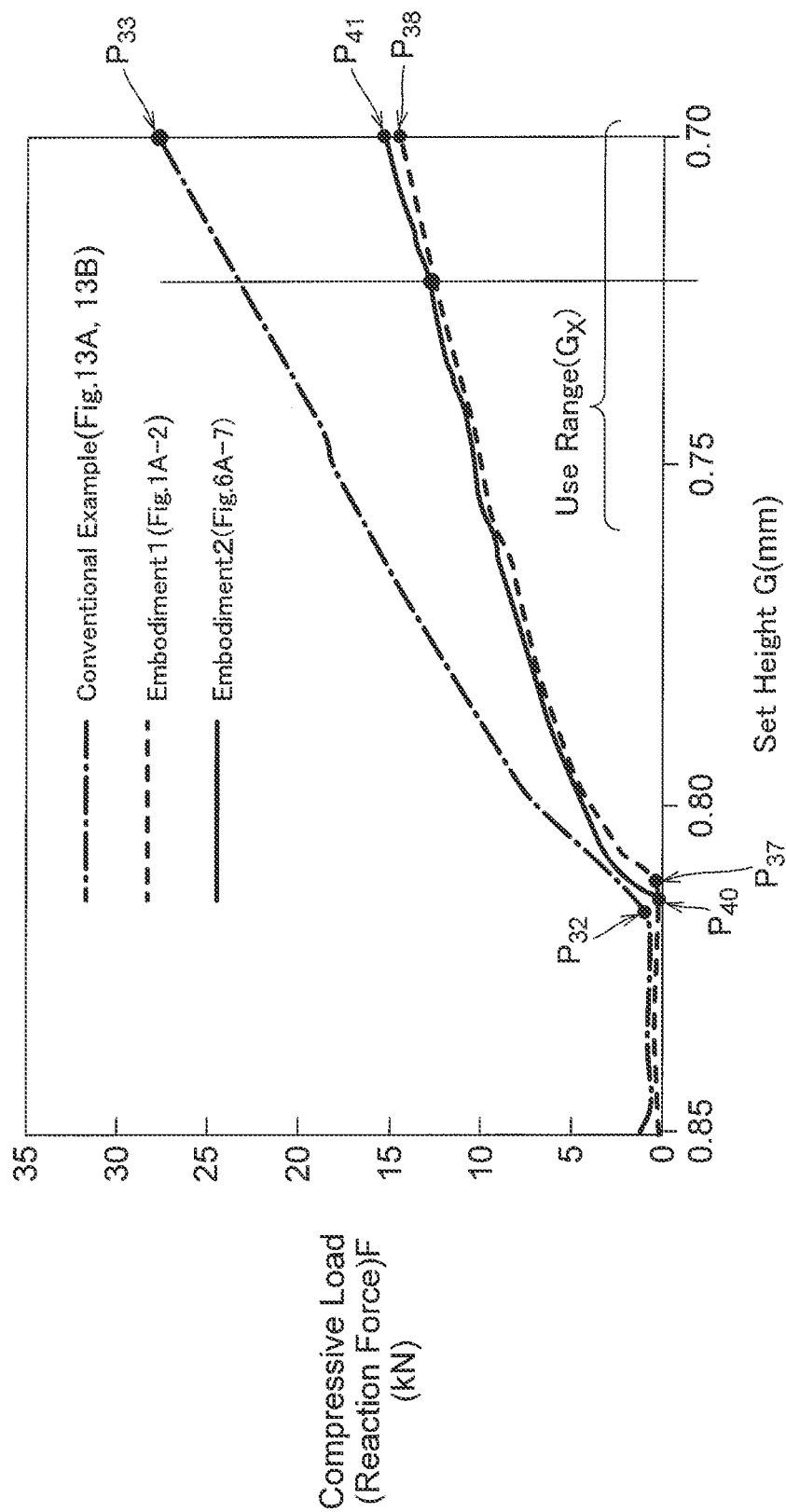
FIG. 11 is a graph showing load characteristic comparing the embodiments 1 and 2 with a conventional example (including a use range)
Figure 12:
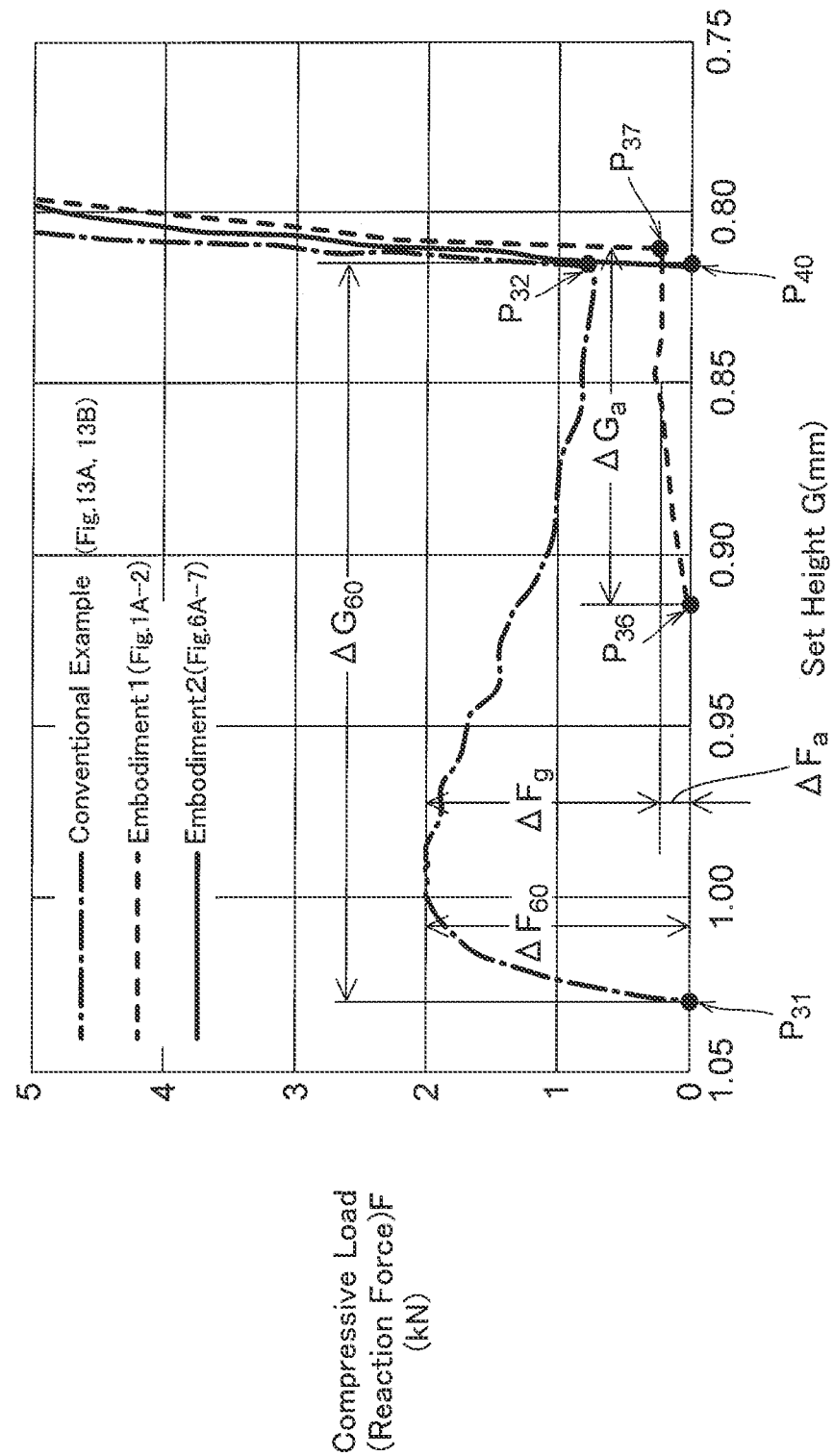
FIG. 12 is a graph showing load characteristic in a rotation elastic deformation area comparing the embodiments 1 and 2 with the conventional example.

FIG. 11 and FIG. 12 are graphs in which the set height G (mm) is plotted on the axis of abscissa, and the compressive load F (kN) is plotted on the axis of ordinate. The compressive load F (kN) may also be called "reaction force" from the seals S and 60 received by the first plane $P_1$ and the second plane $P_2$.

As shown in FIG. 11 and FIG. 12 (enlarging a principal portion of FIG. 11), the present invention and the conventional example show great characteristic differences.

To describe FIG. 11 and FIG. 12, the graph line of one-dot chain line shows the characteristic of the conventional example shown in FIG. 13A through FIG. 14. A point $P_{31}$ shows a compression starting point on which the first convex portion 66 and the second convex portion 67 lightly contact the first plane $P_1$ and the second plane $P_2$.

A point $P_{32}$ shows a starting point of 4-point contact. That is to say, from the compression starting point $P_{31}$, on which the first convex portion 66 and the second convex portion 67 receive pressing force from the first plane $P_1$ and the second plane $P_2$, and, (although not shown in figures) the corner portions 68 and 69 contact the first plane $P_1$ and the second plane $P_2$ for the first time.

As clearly shown also in FIG. 12, in the metal seal 60 of the conventional example, large compressive load (reaction force) $F_{60}$ is generated in an elastic rotation area from the point $P_{31}$ to the point $P_{32}$ ($F_{60}$=2:0 kN is shown in FIG. 12).

$\Delta\,G_{60}$ is a movement amount to reduce the interval dimension Hp of the two planes $P_1$ and $P_2$ from the point $P_{31}$ to the point $P_{32}$, and the amount is considerably large. Further, large reaction force $\Delta\,F_{60}$ is necessary for the rotation elastic deformation in the movement amount $\Delta\,G_{60}$.

When the set height G (interval dimension Hp) is from the starting point $P_{32}$ of 4-point contact to a point $P_{33}$ of the final fastened and compressed state (final set state) shown in FIG. 14, rapid increase of the reaction force F is observed (refer to FIG. 11).

That is to say, the graph line shown with the one-dot chain line of the conventional example in FIG. 11 shows increase of the reaction force (compressive load) F from the point $P_{32}$ to the point $P_{33}$ with a steep slope.

On the contrary, the embodiment 1 of the present invention shown with a broken line in FIG. 11 and FIG. 12 is as described below. That is to say, a point $P_{36}$ shows a compression starting point on which the first convex main portion 1 and the second main convex portion 2 (refer to figure lightly contact the first plane $P_1$ and the second plane $P_2$.

A point $P_{31}$ shows a starting point of 4-point contact. That is to say, rotation elastic deformation is slightly made in FIG. 2, and the arc-shaped peak portions 6 lightly contact the planes $P_1$ and $P_2$.

$\Delta$ Ga is a movement amount to reduce the interval dimension Hp of the two planes $P_1$ and $P_2$ from the point $P_{36}$ to the point $P_{37}$, and the amount is sufficiently smaller than the corresponding movement amount $\Delta\,G_{60}$ of the conventional example. Further, reaction force (compressive load) $\Delta$ Fa necessary for the rotation elastic deformation in the movement amount $\Delta$ Ga of the embodiment 1 is remarkably smaller than the reaction force (compressive load) $\Delta\,F_{60}$ of the conventional example. And, in FIG. 12, $\Delta$ Fg shows the difference of the reaction force of the both seals.

That is to say, in the embodiment 1 of the present invention, the movement amount $\Delta$ Ga of the set height from the point $P_{36}$ to the point $P_{37}$, and the necessary compressive load (reaction force) $\Delta$ Fa are remarkably smaller than that of the conventional example. Therefore, there is an advantage to remarkably reduce the possibility of generating scratches on the first plane $P_1$ and the second plane $P_2$ by the first convex main portion 1 and the second main convex portion 2 in comparison with the conventional example.

To explain with FIG. 11 (FIG. 12) further, on the broken graph line of the embodiment 1, the reaction force F increases very slowly from the starting point $P_{37}$ of 4-point contact to a point $P_{38}$ of the final fastened and compressed state (final set state) shown in FIG. 4 in comparison with the one-dot chain line of the conventional example.

That is to say, the graph line shown with the broken line of the embodiment 1 of the present invention shows slow increase of the reaction force F from the point $P_{37}$ to the point $P_{38}$ with a gentle slope.

Therefore, according to the embodiment 1 of the present invention, the first and second planes $P_1$ and $P_2$, namely, flange faces can be prevented from being damaged because the increase of the reaction force (fastening force) F is slow against the compression after the starting point $P_{37}$ of 4-point contact on which sealing ability appears. Further, load on bolts necessary for fastening can be reduced, along this, the diameter of the bolt can be small and number of the bolts can be reduced to make the apparatus small and reduce the cost. Further, the interval dimension Hp between the two planes and may generate dispersion in an actual apparatus (device) for working dimensional error, condition of use such as temperature, pressure, etc. However, the graph line of the broken line shown in FIG. 11 shows that the reaction force F hardly increases or decreases even when the set height G changes larger or smaller than a predetermined value, therefore, sealing ability can be kept stable and well.

Next, concerning the embodiment 2 of the present invention shown in FIG. 6A through FIG. 9, change of the compressive load (reaction force) F to the set height G (mm), etc. will be described with solid lines (of the graphs) in FIG. 11 and FIG. 12.

In FIG. 11 and FIG. 12 showing an enlarged principal portion of FIG. 11, the one-dot chain line is of the conventional, example (refer to FIG. 13A through FIG. 14) as described above.

On the contrary, the metal seal S of the embodiment 2 of the present invention in FIG. 7 is compressed to deform as shown in FIG. 9 without elastic rotation deformation. Therefore, in FIG. 11 and FIG. 12, height change (movement amount) $\Delta$ Ga in the first embodiment and $\Delta\,G_{60}$ in the conventional example don't exist (don't appear).

Therefore, a point $P_{40}$ can be called a starting point of 4-point contact and compression.

Then, as shown in FIG. 11, the solid line, drawing a gentle slope approximately same as the embodiment 1, reaches for a point $P_{41}$ of final set state. The point $P_{41}$ of the embodiment 2 approximately corresponds to the point $P_{38}$ of the embodiment 1 (the reaction force F has approximately same value).

As clearly shown in FIG. 11 and FIG. 12, "movement" from the compression starting point $P_{31}$ to the 4-point contact starting point $P_{32}$, showing the large reaction $\Delta\,G_{60}$ in the conventional example, is completely omitted in the embodiment 2 of the present invention. Because of this, scratch is not generated on the first plane $P_1$ and the second plane $P_2$ in the embodiment 2. Therefore, sealing ability is stable and excellent.

Further, in the embodiment 2 of the present invention, the solid line of the graph in FIG. 11 from the starting point $P_{40}$ of 4-point contact and compression to the point $P_{41}$ of final set state shows that the reaction force F extremely slowly increases in comparison with the one-dot chain line of the conventional example.

Therefore, according to the embodiment 2 of the present invention, the first and second planes $P_1$ and $P_2$, namely, flange faces can be prevented from being damaged because the increase of the reaction force (fastening force) F is slow against the compression after the point $P_{40}$ on which sealing ability appears. Further, load on bolts necessary for fastening can be reduced, along this, the diameter of the bolt can be small and number of the bolts can be reduced to make the apparatus small and reduce the cost. Further, the interval dimension Hp between the two planes $P_1$ and $P_9$ may generate dispersion in an actual apparatus (device) for working dimensional error, condition of use such as temperature, pressure, etc. However, the graph line of the solid line shown in FIG. 11 shows that the reaction force F hardly increases or decreases even when the set height G changes larger or smaller than predetermined value, therefore, sealing ability can be kept stable and well.

Figure 10:
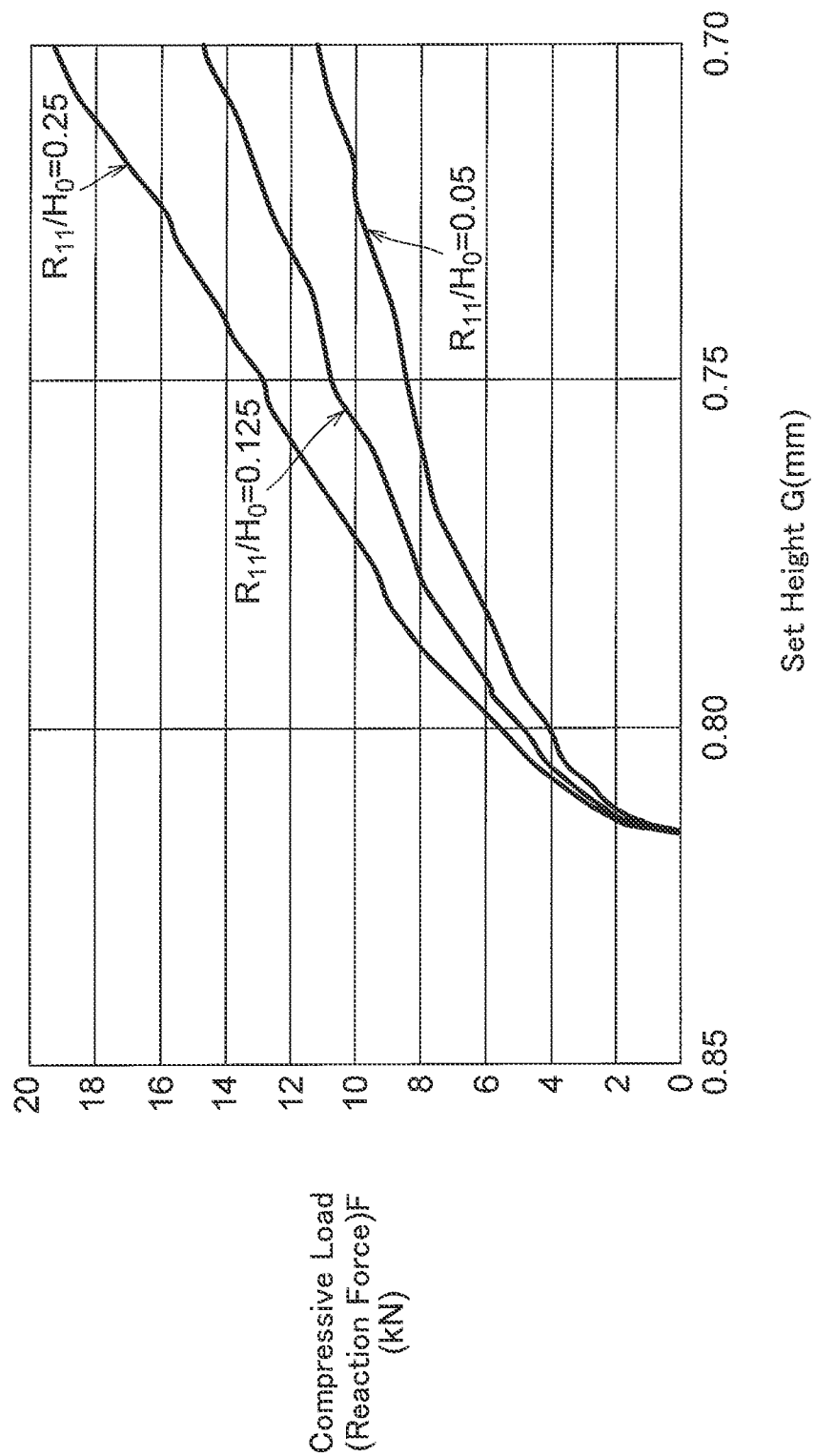
FIG. 10 is a graph showing load characteristic.

As shown by the above-described formula 2, formula 3, and formula 9, desirable upper and lower limits exist for the radiuses of curvature $R_1$ and $R_2$ of the embodiment 1 (FIG. 1A through FIG. 2), and for the radius of curvature $R_{11}$ of the embodiment 2 (FIG. 6A through FIG. 7). FIG. 10 is a graph showing how the reaction force F change against the set height G (by FEM analysis) in case that the radius of curvature $R_{11}$ in the embodiment 2 is changed. The mark $H_0$ shows the height of the metal seal S.

Concerning the change of the compressive load (reaction force) with the upper and lower limits of the radiuses of curvature $R_1$ and $R_2$ shown by the above-described formula 2 and formula 3 in the embodiment 1 (FIG. 1A through FIG. 2), the graph of the embodiment 2 shown in FIG. 10 is also a reference.

That is to say, to explain FIG. 10, the case of $R_{11}/H_0=0.125$ approximately corresponds to the solid line (the embodiment 2) and the broken line (the embodiment 1).

And, in the case of $R_{11}/H_0=0.05$, the slope is gentle. And, in the case of $R_{11}/H_0=0.26$, the slope rapidly changes. However, these graph lines are within an appropriate range for practical sealing ability and contact pressure on the flange face.

In the present invention as described above in detail, the inner peripheral face and the outer peripheral face of the seal are circular faces without convexes and concaves, the seal can be easily chucked by machine tool to be rapidly and easily worked by cutting or polishing of lateral-cut material because the metal seal, entirely ring-shaped and disposed between the first plane $P_1$ and the second plane $P_2$ which are mutually parallel, has a construction in which the middle base portion 3 of which cross-sectional configuration is rectangular, the first main convex portion 1 on the inner side to contact the first plane $P_1$, the first auxiliary convex portion 11 on the outer side, the second main convex portion 2 on the outer side to contact the second plane $P_2$, and the second auxiliary convex portion 12 on the inner side, are provided; the inner peripheral portion 1A of the first main convex portion 1, the inner short side 31 of the middle base portion 3, and the inner peripheral portion 12A of the second auxiliary convex portion 12 are continuous in cross-sectional face with the common straight line $L_{10}$; the outer peripheral portion 2A of the second main convex portion 2, the outer short side 32 of the middle base portion 3, and the outer peripheral portion 11A of the first auxiliary convex portion 11 are continuous in cross-sectional face with a common straight line $L_{20}$; and, the first main convex portion 1 and the second main convex portion 2 respectively have the arc-shaped peak portion 5 on the forth end, and, the first auxiliary convex portion 11 and the second auxiliary convex portion 12 respectively have the arc-shaped peak portion 6 on the forth end. And, the increase of the reaction force F against the set height G is slow, the reaction force F is kept at approximately same value even if difference is generated in the set height formed by the first and second planes $P_1$ and $P_2$, and excellent sealing ability can be kept. And, excessive pressure is not given to the first and second planes $P_1$ and $P_2$ to prevent scratch on the flange face, etc. Further, load on bolts necessary for fastening can be reduced, along this, the diameter of the bolt can be small and number of the bolts can be reduced to make the apparatus small and reduce the cost.

And, the slope of the contact pressure (reaction force) F against the set height G can be made gentle as shown in FIG. 11, the load by mutual approach of the first and second planes $P_1$ and $P_2$ can be reduced because dimension of the bottom side 1B of the first main convex portion 1 and the bottom side 2B of the second main convex portion 2 is $W_1$, dimension of the long side 3A of the middle base portion 3 is $W_0$, and the relationship $0.20 \cdot W_0 \leq W_1 \leq 0.45 \cdot W_0$ is fulfilled.

And, the slope is made gentle, the load by mutual approach of the first and second planes $P_1$ and $P_2$ can be reduced because the radius of curvature of the arc-shaped peak portion 5 of the forth end of the first main convex portion 1 and the second main convex portion 2 in cross-sectional face is $R_1$, height dimension of the entire metal seal is $H_0$, and the relationship $0.05 \cdot H_0 \leq R_1 \leq 0.25 \cdot H_0$ is fulfilled. By this construction, damage on the planes $P_1$ and $P_2$ call be prevented, and high sealing ability can be shown.

And, the slope is made gentle, the load by mutual approach of the first and second planes $P_1$ and $P_2$ can be reduced, and damage on the planes $P_1$ and $P_2$ can be prevented with sufficient sealing ability because the radius of curvature of the arc-shaped peak portion 6 of the forth end of the first auxiliary convex portion 11 and the second auxiliary convex portion 12 is $R_2$, height dimension of the entire metal seal is $H_0$, and the relationship $0.05 \cdot H_0 \leq R_2 \leq 0.125 \cdot H_0$ is fulfilled.

And, the arc-shaped peak portions 5 of the first main convex portion 1 and the second main convex portion 2 smoothly rotate against the planes $P_1$ and $P_2$ from the state of FIG. 2 to the final set state shown in FIG. 4 through the 4-point contact (refer to the arrow $M_1$ in FIG. 5) because distances from the center $0_1$ of an inscribed circle in cross-sectional face of the arc-shaped peak portion 5 of the forth end of the first main convex portion 1 and the second main convex portion 2 to respectively nearer one of the common straight lines $L_{10}$ and $L_{20}$ are $X_1$ and $X_2$, height dimension of the entire metal seal is $H_0$, and the relationships $0 \leq X_1 \leq 0.25 \cdot H_0$ and $0 \leq X_2 \leq 0.125 \cdot H_0$ are fulfilled.

And, elastic force and rigidity of the first main convex portion 1 and the second main convex portion 2 can be appropriately set, and the gentle slope characteristic shown with the broken line in FIG. 11 can be obtained because the angle formed by ridge lines on outer and inner peripheral sides of the first main convex portion 1 and the second main convex portion 2 is $\theta_1$, the angle formed by ridge lines on outer and inner peripheral sides of the first auxiliary convex portion 11 and the second auxiliary convex portion 12 is $\theta_2$, and the relationships $25° \leq \theta_1 \leq 45°$ and $25° \leq \theta_2 \leq 45°$ are fulfilled.

And, the seal immediately (without elastic rotation deformation) starts compressed deformation (refer to the point $P_{40}$ in FIG. 11 and FIG. 12) because the metal seal, entirely ring-shaped and disposed between the first plane $P_1$ and the second plane $P_2$ which are mutually parallel, has a construction in which the middle base portion 3 of which cross-sectional configuration is rectangular, a first inner convex portion 15 on the inner side to contact the first plane $P_1$, the first outer convex portion 16 on an outer side, the second outer convex portion 17 on the outer side to contact the second plane $P_2$, and the second inner convex portion 18 on the inner side, are provided; the inner peripheral portion 15A of the first inner convex portion 15, the inner short side 31 of the middle base portion 3, and the inner peripheral portion 18A of the second inner convex portion 18 are continuous in cross-sectional face with the common straight line $L_{10}$; the outer peripheral portion 17A of the second outer convex portion 17, the outer short side 32 of the middle base portion 3, and the outer peripheral portion 16A of the first outer convex portion 16 are continuous in cross-sectional face with the common straight line $L_{20}$; and the first inner convex portion 15, the first outer convex portion 16, the second outer convex portion 17, and the second inner convex portion 18 are respectively having the arc-shaped peak portion 5 on the forth end and same height. Therefore, as described above with FIG. 12, the scratch, generated on the planes $P_1$ and $P_2$ of the flange, etc. along the large set height movement amount $\Delta G_{60}$ and the large reaction force $F_{60}$ of the conventional example, can be completely prevented. Further, as shown in FIG. 11, the graph line (solid line) showing the reaction force F against the set height G is gentle with about half slope in comparison with the conventional example of FIGS. 13A and 13B. Therefore, the first and second planes $P_1$ and $P_2$, namely, flange faces can be prevented from being damaged. Further, load on bolts necessary for fastening can be reduced, along this, the diameter of the bolt can be small and number of the bolts can be reduced to make the apparatus small and reduce the cost. Further, the interval dimension Hp between the two planes $P_1$ and $P_2$ may generate dispersion in an actual apparatus (device) for working dimensional error, condition of use such as temperature, pressure, etc. However, the graph line of the solid line shown in FIG. 11 shows that the reaction force F hardly increases or decreases even when the set height G changes larger or smaller than a predetermined value, therefore, sealing ability can be kept stable and well.

Further, there is also an advantage that the seal can be chucked by machine tool to be rapidly and easily worked by cutting or polishing of lateral-cut ring material because the inner diameter and the outer diameter are the straight lines $L_{10}$ and $L_{20}$ (as clearly shown in FIG. 7).

And, the slope of the reaction force F against the set height G can be made gentle as shown in FIG. 11, the load by mutual approach of the first plane $P_1$ and the second plane $P_2$ can be reduced because dimension of the bottom side 20 of all of the first inner convex portion 15, the first outer convex portion 16, the second outer convex portion 17, and the second inner convex portion 18 is $W_1$, dimension of the long side 3A of the middle base portion 3 is $W_0$, and the relationship $0.20 \cdot W_0 \leq W_1 \leq 0.45 \cdot W_0$ is fulfilled.

And, the slope is made gentle as shown FIG. 10, the load by mutual approach of the first plane $P_1$ and the second plane $P_2$ can be reduced, sufficient sealing ability is shown, and damage on the planes $P_1$ and $P_2$ can be prevented because radius of curvature of the arc-shaped peak portion 5 of the first inner convex portion 15, the first outer convex portion 16, the second inner convex portion 18, and the second outer convex portion 17 in cross-sectional face is $R_{11}$, height dimension of the entire metal seal is $H_0$, and the relationship $0.05 \cdot H_0 \leq R_{11} \leq 0.25 \cdot H_0$ is fulfilled.

And, from the first contact, with the 2 planes $P_1$ and $P_2$ (refer to the point $P_{40}$ in FIG. 11 and FIG. 12), then, till the final set state shown in FIG. 9, the arc-shaped peak portions 5 can smoothly deform like opening legs in radial inner direction and radial outer direction against the planes $P_1$ and $P_2$ because distance from the center $0_1$ of an inscribed circle in cross-sectional face of the arc-shaped peak portion 5 of the first inner convex portion 15, the second inner convex portion 18, the first outer convex portion 16, and the second outer convex portion 17 to respectively nearer one of the common straight lines $L_{10}$ and $L_{20}$ is $X_{11}$, height dimension of the entire metal seal is $H_0$ and the relationship $0 \leq X_{11} \leq 0.25 \cdot H_0$ is fulfilled.

And, elastic force and rigidity (against the planes $P_1$ and $P_2$) of each of the 4 inner convex portions 15, 16, 17, and 18 can be appropriately set, and the gentle slope characteristic shown with the solid line in FIG. 11 can be obtained because the angle formed by ridge lines on outer and inner peripheral sides of the first inner convex portion 15, the second inner convex portion 18, the first outer convex portion 16, and the second outer convex portion 17 is $\theta_{11}$, and the relationship $25° \leq \theta_{11} \leq 45°$ is fulfilled.

While preferred embodiments of the present invention have been described in this specification, it is to be understood that the invention is illustrative and not restrictive, because various changes are possible within the spirit and indispensable features.

What is claimed is:

1. A metal seal, entirely ring-shaped and disposed between a first plane and a second plane which are mutually parallel, comprising a construction in which:
   a middle base portion of which cross-sectional configuration is rectangular, a first main convex portion on an inner side to contact the first plane, a first auxiliary convex portion on an outer side, a second main convex portion on the outer side to contact the second plane, and a second auxiliary convex portion on the inner side, are provided;
   an inner peripheral portion of the first main convex portion, an inner short side of the middle base portion, and an inner peripheral portion of the second auxiliary convex portion are continuous in cross-sectional face with a common straight line;
   an outer peripheral portion of the second main convex portion, an outer short side of the middle base portion, and an outer peripheral portion of the first auxiliary convex portion are continuous in cross-sectional face with a common straight line; and
   the first main convex portion and the second main convex portion respectively have an arc-shaped peak portion on a forth end, and, the first auxiliary convex portion and the second auxiliary convex portion respectively have an arc-shaped peak portion on a forth end.

2. The metal seal as set forth in claim 1, wherein dimension of a bottom side of the first main convex portion and a bottom side of the second main convex portion is $W_1$, dimension of a long side of the middle base portion is $W_0$, and a formula 1 below is fulfilled.

$$0.20 \cdot W_0 \leq W_1 \leq 0.45 \cdot W_0 \qquad \text{(formula 1)}$$

3. The metal seal as set forth in claim 1, wherein radius of curvature of the arc-shaped peak portion of the forth end of the first main convex portion and the second main convex portion in cross-sectional face is $R_1$, height dimension of the entire metal seal is $H_0$, and a formula 2 is fulfilled.

$$0.05 \cdot H_0 \leq R_1 \leq 0.25 \cdot H_0 \qquad \text{(formula 2)}$$

4. The metal seal as set forth in claim 1, wherein radius of curvature of the arc-shaped peak portion of the forth end of the first auxiliary convex portion and the second auxiliary convex portion is $R_2$, height dimension of the entire metal seal is $H_0$, and a formula 3 below is fulfilled.

$$0.05 \cdot H_0 \leq R_2 \leq 0.125 \cdot H_0 \quad \text{(formula 3)}$$

5. The metal seal as set forth in claim 1, wherein distance from a center of an inscribed circle in cross-sectional face of the arc-shaped peak portion of the forth end of the first main convex portion and the second main convex portion to respectively nearer one of the common straight lines are $X_1$ and $X_2$, height dimension of the entire metal seal is $H_0$, and formulas 4 and 5 below are fulfilled.

$$0 \leq X_1 \leq 0.25 \cdot H_0 \quad \text{(formula 4)}$$

$$0 \leq X_2 \leq 0.125 \cdot H_0 \quad \text{(formula 5)}$$

6. The metal seal as set forth in claim 1, wherein an angle formed by ridge lines on outer and inner peripheral sides of the first main convex portion and the second main convex portion is $\Theta_1$, an angle formed by ridge lines on outer and inner peripheral sides of the first auxiliary convex portion and the second auxiliary convex portion is $\Theta_2$, and formulas 6 and 7 below are fulfilled.

$$25° \leq \Theta_1 \leq 45° \quad \text{(formula 6)}$$

$$25° \leq \Theta_2 \leq 45° \quad \text{(formula 7)}$$

7. A metal seal, entirely ring-shaped and disposed between a first plane and a second plane which are mutually parallel, comprising a construction in which:
 a middle base portion of which cross-sectional configuration is rectangular, a first inner convex portion on an inner side to contact the first plane, a first outer convex portion on an outer side, a second outer convex portion on the outer side to contact the second plane, and a second inner convex portion on the inner side, are provided;
 an inner peripheral portion of the first inner convex portion, an inner short side of the middle base portion, and an inner peripheral portion of the second inner convex portion are continuous in cross-sectional face with a common straight line;
 an outer peripheral portion of the second outer convex portion, an outer short side of the middle base portion, and an outer peripheral portion of the first outer convex portion are continuous in cross-sectional face with a common straight line; and
 the first inner convex portion, the first outer convex portion, the second outer convex portion, and the second inner convex portion are respectively having an arc-shaped peak portion on a forth end and same height.

8. The metal seal as set forth in claim 7, wherein dimension of a bottom side of all of the first inner convex portion, the first outer convex portion, the second outer convex portion, and the second inner convex portion is $W_1$, dimension of a long side of the middle base portion is $W_0$, and a formula 8 below is fulfilled.

$$0.20 \cdot W_0 \leq W_1 \leq 0.45 \cdot W_0 \quad \text{(formula 8)}$$

9. The metal seal as set forth in claim 7, wherein radius of curvature of the arc-shaped peak portion of the first inner convex portion, the first outer convex portion, the second inner convex portion, and the second outer convex portion in cross-sectional face is $R_{11}$, height dimension of the entire metal seal is $H_0$, and a formula 9 below is fulfilled.

$$0.05 \cdot H_0 \leq R_{11} \leq 0.25 \cdot H_0 \quad \text{(formula 9)}$$

10. The metal seal as set forth in claim 7, wherein distance from a center of an inscribed circle in cross-sectional face of the arc-shaped peak portion of the first inner convex portion, the second inner convex portion, the first outer convex portion, and the second outer convex portion to respectively nearer one of the common straight lines is $X_{11}$, height dimension of the entire metal seal is $H_0$, and the formula 10 below is fulfilled.

$$0 \leq X_{11} \leq 0.25 \cdot H_0 \quad \text{(formula 10)}$$

11. The metal seal as set forth in claim 7, wherein an angle formed by ridge lines on outer and inner peripheral sides of the first inner convex portion, the second inner convex portion, the first outer convex portion, and the second outer convex portion is $\Theta_{11}$, and formula 11 below is fulfilled.

$$25° \leq \Theta_{11} \leq 45° \quad \text{(formula 11)}$$

* * * * *